United States Patent [19]

Kuriyama et al.

[11] Patent Number: 4,924,377

[45] Date of Patent: May 8, 1990

[54] PIPELINED INSTRUCTION PROCESSOR CAPABLE OF READING DEPENDENT OPERANDS IN PARALLEL

[75] Inventors: Kazunori Kuriyama, Hadano; Kenichi Wada, Sagamihara; Akira Yamaoka, Hadano, all of Japan

[73] Assignee: Hitachi, Ltd., Tokyo, Japan

[21] Appl. No.: 687,161

[22] Filed: Dec. 28, 1984

[30] Foreign Application Priority Data

Dec. 28, 1983 [JP] Japan .................................. 58-246281

[51] Int. Cl.$^5$ .......................... G06F 9/28; G06F 9/22; G06F 9/38
[52] U.S. Cl. .................................... 364/200; 364/263; 364/231.8; 364/244.6; 364/262.4; 364/262.8; 364/261.3; 364/261.5
[58] Field of Search ... 364/200 MS File, 900 MS File, 364/736

[56] References Cited

U.S. PATENT DOCUMENTS

| | | | |
|---|---|---|---|
| 4,130,868 | 12/1978 | Heuer | 364/200 |
| 4,197,578 | 4/1980 | Wada | 364/200 |
| 4,210,960 | 7/1980 | Borgerson | 364/200 |
| 4,398,245 | 8/1983 | Fujita | 364/200 |
| 4,467,415 | 8/1984 | Ogawa | 364/200 |
| 4,556,938 | 12/1985 | Parker | 364/200 |
| 4,594,655 | 6/1986 | Hao et al. | 364/200 |

Primary Examiner—Raulfe B. Zache
Assistant Examiner—Emily Y. Chan
Attorney, Agent, or Firm—Antonelli, Terry & Wands

[57] ABSTRACT

Address calculation adders and a buffer storages are each independently provided for each operand of an instruction requiring two or more operands. In the translation instruction processing, the address calculations and operand fetch operations on the first and second operands are substantially asynchronously conducted. Consequently, the overhead that takes place one every n second operand fetch operations can be removed by independently and asynchronously performing the address calculations and operand fetch operations by use of a plurality of address adders. Moreover, the circuit for separating and obtaining a byte from the operand buffer can be dispensed with by adopting an operation procedure in which a byte of the first operand is fetched and is stored in temporary store means that supplies the address adder the data stored therein.

10 Claims, 6 Drawing Sheets

FIG. IA
PRIOR ART

| 0 | 7 8 | 15 16 19 20 | 31 32 35 36 | 47 |
|---|---|---|---|---|
| $\overline{OP}$ | $L_1$ | $B_1$ | $D_1$ | $B_2$ | $D_2$ |

FIG. IB
PRIOR ART

| ARGUMENT BYTE NUMBER | ARGUMENT BYTE ADDRESS $(A_{1i})$ | ARGUMENT BYTE CONTENT $(D_{1i})$ | |
|---|---|---|---|
| | | BEFORE | AFTER |
| 1 | $A_{11} = (B_1) + D_1$ | $D_{11} = \overline{OP}_{11}$ | $D_{11}' = \overline{OP}_{21}$ |
| 2 | $A_{12} = (B_1) + D_1 + 1$ | $D_{12} = \overline{OP}_{12}$ | $D_{12}' = \overline{OP}_{22}$ |
| 3 | $A_{13} = (B_1) + D_1 + 2$ | $D_{13} = \overline{OP}_{13}$ | $D_{13}' = \overline{OP}_{23}$ |
| 4 | $A_{14} = (B_1) + D_1 + 3$ | $D_{14} = \overline{OP}_{14}$ | $D_{14}' = \overline{OP}_{24}$ |
| ⋮ | ⋮ | ⋮ | ⋮ |
| L | $A_{1L} = (B_1) + D_1 + L - 1$ | $D_{1L} = \overline{OP}_{1L}$ | $D_{1L}' = \overline{OP}_{2L}$ |

FIG. IC
PRIOR ART

| FUNCTION BYTE NUMBER | FUNCTION BYTE ADDRESS $(A_{2i})$ | FUNCTION BYTE CONTENT $(D_{2i})$ |
|---|---|---|
| 1 | $A_{21} = (B_2) + D_2 + (A_{11}) = (B_2) + D_2 + \overline{OP}_{11}$ | $D_{21} = \overline{OP}_{21}$ |
| 2 | $A_{22} = (B_2) + D_2 + (A_{12}) = (B_2) + D_2 + \overline{OP}_{12}$ | $D_{22} = \overline{OP}_{22}$ |
| 3 | $A_{23} = (B_2) + D_2 + (A_{13}) = (B_2) + D_2 + \overline{OP}_{13}$ | $D_{23} = \overline{OP}_{23}$ |
| 4 | $A_{24} = (B_2) + D_2 + (A_{14}) = (B_2) + D_2 + \overline{OP}_{14}$ | $D_{24} = \overline{OP}_{24}$ |
| ⋮ | ⋮ | ⋮ |
| L | $A_{2L} = (B_2) + D_2 + (A_{1L}) = (B_2) + D_2 + \overline{OP}_{1L}$ | $D_{2L} = \overline{OP}_{2L}$ |

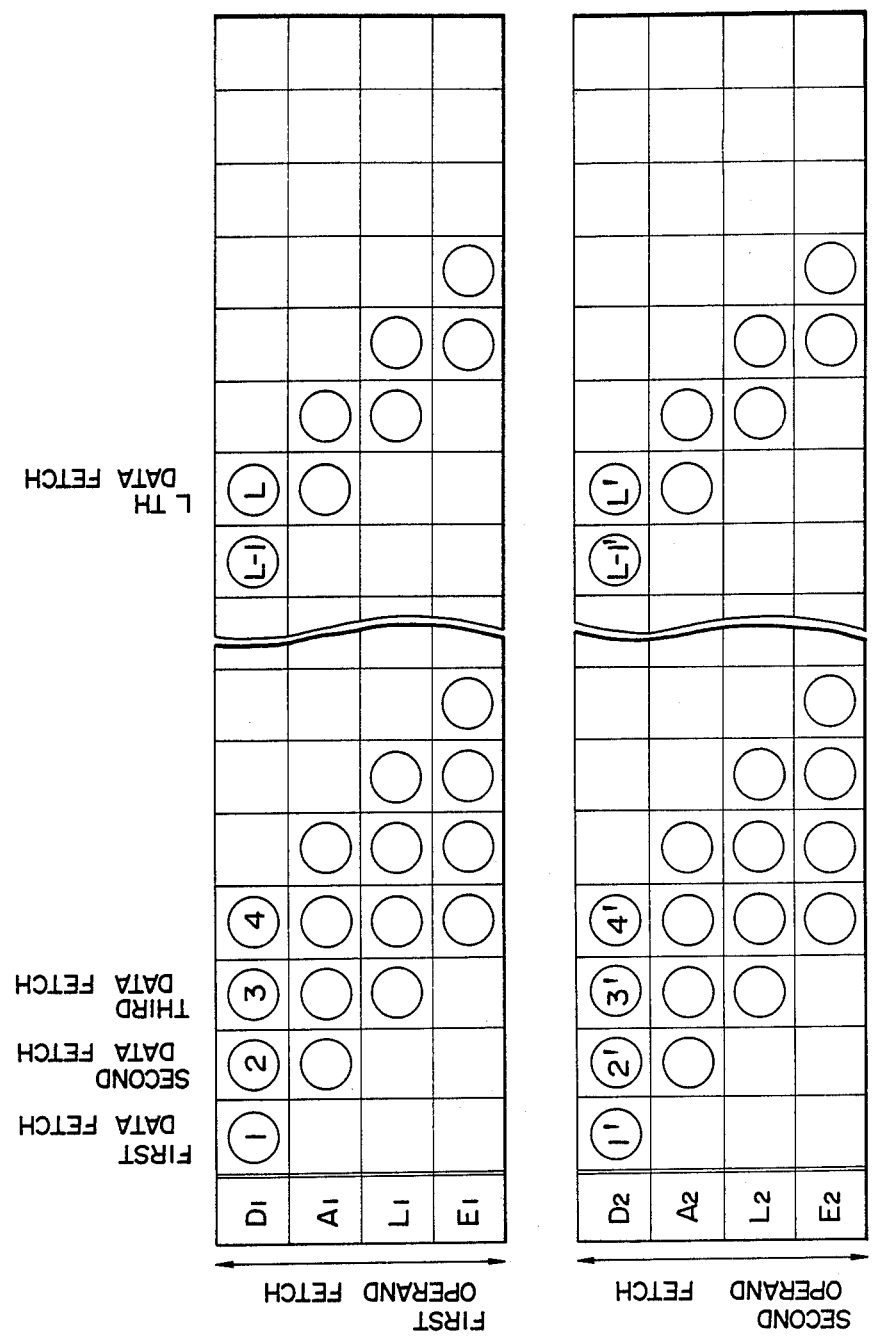

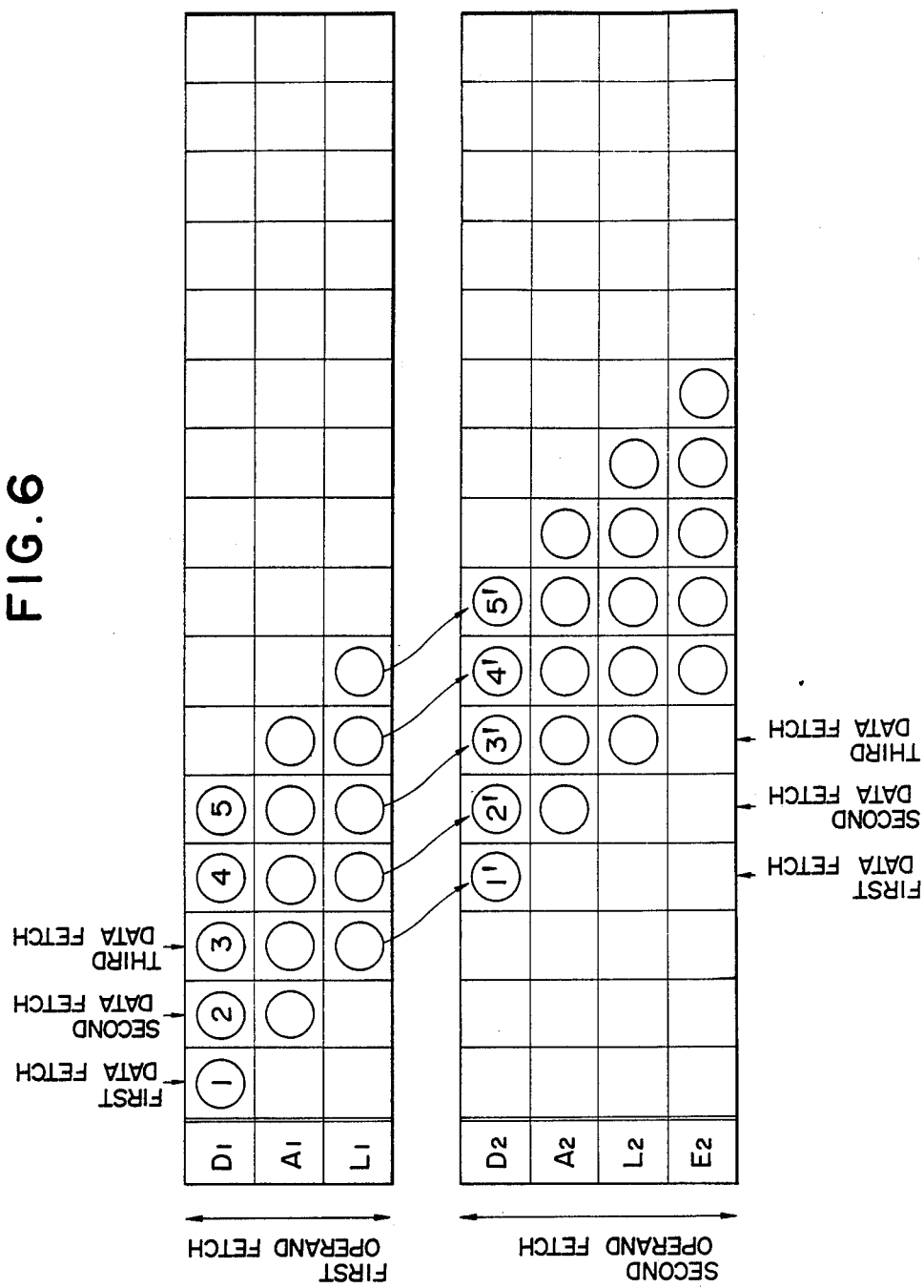

PIPELINED INSTRUCTION PROCESSOR CAPABLE OF READING DEPENDENT OPERANDS IN PARALLEL

BACKGROUND OF THE INVENTION

The present invention relates to an instruction processor for executing translation instructions in accordance with pipeline control.

A translation instruction is an instruction to be utilized, for example, to translate EBCDIK codes into ISO codes.

FIG. 1A depicts the instruction format of translation instructions. Bits 0–7 of the instruction constitute an operation code (to be referred to as OP code hereinafter). A length part comprises bits 8–15 and indicates the operand length of the first operand. Bits 16–19 and 20–31 represent the base register number and displacement, respectively of the first operand; while bits 32–35 and 36–47 indicate the base register number and displacement, respectively of the second operand. The first addresses of the first and second operands each is obtained by adding the displacement to the base register content.

A plurality of data items are fetched from a buffer storage (FIG. 2) to be described later by specifying a first address obtained by use of the base register and the displacement of the first operand. These fetched data items are called argument bytes which form the first operand. The address value of the second operand is added to the respective argument value of the first operand in order to obtain a plurality of data items (function bytes) from the buffer storage by specifying the results of the addition described above as the relevant addresses, thereby replacing the store positions for storing the argument bytes in the buffer storage with the function bytes.

FIG. 1B illustrates the address $A_{1i}$ (i=1 to L) of a plurality of argument bytes and the values of data $D_{1i}$ (i=1 to L) stored in the buffer storage before and after execution of a translation instruction. For instance, the address of the i-th argument byte is obtained from $A_{1i}=(B_1)+D_1+i-1$, whereas the values of $D_{1i}$ before the translation instruction execution and $D_{1i}'$ thereafter are represented by $D_{1i}=OP_{1i}$ and $D_{1i}'=OP_{2i}$, respectively. Notation of $(B_1)$ indicates the content (address value) of a register specified by $B_1$.

FIG. 1C shows values obtained by adding the argument byte values $OP_{1i}$ (i=1 to L) to the respective second operand address values $((B_2)+D_2)$ and the values of store data (function bytes), $D_{2i}=OP_{2i}$ (i=1 to L) fetched from the buffer storage by specifying the results of the addition as the fetch addresses.

FIG. 2 is a schematic block diagram illustrating the prior art instruction processor. FIG. 3 is a processing flow of instruction execution in the prior art instruction processor. Referring to FIG. 2, an instruction register 10 is in the state for holding an instruction in the format of FIG. 1A. The instruction processor of FIG. 2 further comprises selectors 20 and 21 for selecting base register numbers B1 and B2 and displacement D1 and D2. The base register number B1 and displacement D1 are selected to execute an address calculation for the first operand, while the base register number B2 and displacement D2 are selected to calculate the address of the second operand. An incrementer 11 is provided to generate a constant unit to each argument byte when the first operand address calculation is executed.

The constant unit to each argument byte is 0, 1, ..., and (i−1) for the first, second, ..., and i−th argument bytes, respectively. The step for the value incrementation is one in this example because data in the length of a byte is processed for each execution of the processing. A register group 12 is utilized to hold the values of base registers specified by the base register numbers B1 and B2. A selector 22 selects an incrementer 11 and a one-byte separate circuit 23 for the first and second address calculations, respectively. An adder 13 calculates a buffer storage address, while a buffer storage 15 is used to fetch and store therein a memory data item fetched by use of the address calculated by the adder 13. The buffer storage 15 can fetch a plurality of bytes at a time and can perform a data fetch operation and a data store operation at the different addresses during a cycle on a time-slice basis. The resultant value from the adder 13 is also transferred to a store address buffer 14 and is held as a store address. A signal line 50 supplies a fetch address for a data fetch operation to the buffer storage 15, while a signal line 51 supplies a write address thereto. An aligner circuit 16 aligns data fetched from the buffer storage 15. An align operation is conducted to shift the data fetched from the buffer storage 15 to a predetermined position (for example, at the left or right end). An operand buffer circuit 17 is used to store therein a fetched operand. The instruction processor of FIG. 2 further includes an operation unit 18 and a store data register 19. The one-byte separate circuit 23 receives the first operand from the operand buffer circuit 17 and holds the operand, and also separates the first operand data by one byte at a time and outputs the separated one-byte data item on the signal line 52.

The instruction processor of the prior art depicted in FIG. 2 processes translation instructions in accordance with the processing flow depicted in FIG. 3. Referring to FIG. 3, D, A, L, and E indicate instruction processing cycles in the pipeline control system. The instruction decode cycle D is utilized to decode an instruction stored in the instruction register 10 and to generate information necessary for the instruction processing, and furthermore, to perform an address calculation required to fetch a memory operand for the instruction by use of the address adder 13. In the cycle A, a memory data item is fetched from the buffer storage 15 by use of an operand address calculated in the cycle D. The fetched data item is stored in the operand buffer 17 in the cycle L. A predetermined operation by the instruction is executed in the operation unit 18 during the cycle E.

In the conventional data processing system of FIG. 2, the processing of translation instructions are carried out as follows.

First, the base register value B1 and the displacement D1 are selected by the selectors 20 and 21. The selector 22 selects the value (initially set to 0) from the incrementer 11 in order to calculate the first operand address by use of the adder 13. The address value is transferred to the buffer storage 15 to fetch the first operand; and at the same time, it is stored in the store address buffer 14 so as to be utilized as the store address for storing the second operand. A data item comprising a plurality of bytes (n bytes) can be fetched from the buffer storage 15 at a time. The first operand, which is the fetched data, is stored in the one-byte separate circuit 23 through the operand buffer 17. In the one-byte separate circuit 23 one byte of data is separated from said first operand data at a time and the separated one-byte data item is outputted to the signal line 52. Next, the selectors 20 and 21 select the base register value B2 and displacement D2, respectively, and the selector 22 selects a signal line 52 in order to execute the second operand address calculation by use of the adder 13. That is, an operation of $(B2)+D2+OP_{11}$ is carried out. A byte (function byte) constituting the second operand is fetched from the buffer storage 15 based on the calculated address value and is transferred through the operand buffer 17, the operation unit 18, and the store data storage 19 and is stored in the buffer register 15. When storing the data within the store data register 19 into the buffer storage 15, the fetch address of the first operand which is held in the store address buffer 14 is used. Since at this time the first operand has been fetched by n bytes at one time, it is necessary to carry out n times of data storing for the address held in the store address buffer 14. Thus, the data storing is made such that when storing the second operand the address in the store address buffer 14 is counted up one by one to produce the address for storing, or that until n times of reading out of the second operands have been finished, the second operands to be stored are held in the store register 19, and when n bytes of the second operands have been fetched, the fetched second operands are stored at one time by using the address in the store address buffer 14.

Similarly, the bytes constituting the second operand can be fetched by sequentially separating each byte from the n-byte first operand fetched beforehand in the one-byte separate circuit 23. When the n-th fetch operation is completed, the argument bytes (n bytes) of the subsequent first operand are fetched. After this fetch operation is finished, the (n+1)th second operand fetch operation can be initiated.

FIG. 3 depicts the same operation when n=8. Referring to FIG. 3, the second operand is fetched with a two-cycle overhead elapsed after the first address calculation of the first operand. When the function bytes are successively fetched eight times and the argument bytes first fetched are completely processed, it is allowed to initiate the second operand fetch operation again when the two-cycle overhead time is elapsed after the first operand fetch operation. Consequently, two D cycles are not utilized each time the eight operations described above are completed.

In the conventional data processing system described hereabove, the same adder 13 is utilized to execute the first and second operand calculations and the same buffer storage 15 is used to fetch the argument and function bytes, hence several cycles (two cycles in FIG. 2) of the overhead time appear between the time when the first operand is fetched and the time when the second operand fetch operation is started. The overhead takes place once every n operations described above because of the restriction of the startup operation as well as that of the data width allowed for fetching data from the buffer storage 15 at a time, that of the data width of the operand buffer 17 and one-byte separate circuit 23, and the like. Frequency n is represented by the data length of data which can be stored in the operand buffer 17 and one-byte separate circuit 23 at a time under various restrictions.

In addition, n bytes of the first operand are fetched at a time and are stored in the one-byte seperate circuit 23 to minimize the overhead described above, so the one-byte separate circuit 23 is necessary which separates an associated byte from the n-byte data and transfers, the obtained byte in the address adder 13 each time the second operand address calculation is performed. Further, in the prior art device, while the first operand is read out by n bytes at one time, the storing of the second operand is carried out by every one byte, therefore, it becomes necessary to provide either an address count up circuit within the store address buffer 14 or a circuit for arranging n bytes of data in order within the store data register 19.

SUMMARY OF THE INVENTION

It is therefore an object of the present invention to provide an instruction processor which eliminates the intrinsic overhead occurring at initiation of a second operand fetch operation and occurring once every n operations for fetching the second operand and which further eliminates the need for the one-byte separate circuit for separating and obtaining one byte from the n-byte data, and to avoid any need for the address count up circuit in the store address buffer 14 or the circuit for arranging data in the store data register 19.

For an instruction using two or more operands, an address calculation adder and a buffer storage must be independently provided for each operand. In the translation instruction processing, the address calculation and operand fetch operation on the first and second operands are substantially asynchronously conducted. Consequently, the overhead that takes place once every n second operand fetch operations can be removed by independently and asynchronously performing the address calculation and operand fetch operation by use of a plurality of address adders. Moreover, the circuit for separating and obtaining a byte from the first operand can be dispensed with by not reading the first operand by n bytes at one time but by reading the first operand by every one byte and also by storing the read out data in the buffer storage by every one byte.

BRIEF DESCRIPTION OF THE DRAWINGS

The present invention will be apparent from the following detailed description taken in conjunction with the accompanying drawings, in which:

FIG. 1A is a shematic diagram depicting the instruction format of a translation instruction;

FIG. 1B illustrates the relationships between the argument byte addresses and data stored in the buffer storage;

FIG. 1C depicts the relationships between the function byte addresses and data stored in the buffer storage;

FIG. 5 depicts a processing flow in which operations such as address calculations for two operands and fetch operations from the buffer storage are carried out completely in a synchronous manner; and FIG. 6 illustrates a processing flow in which operations such as address calculations for two operands and fetch operations from the buffer storage are performed completely in an asynchronous manner.

DESCRIPTION OF THE PREFERRED EMBODIMENT

An embodiment of the present invention will be described by referring to FIGS. 4, 5, and 6.

Figure 3:
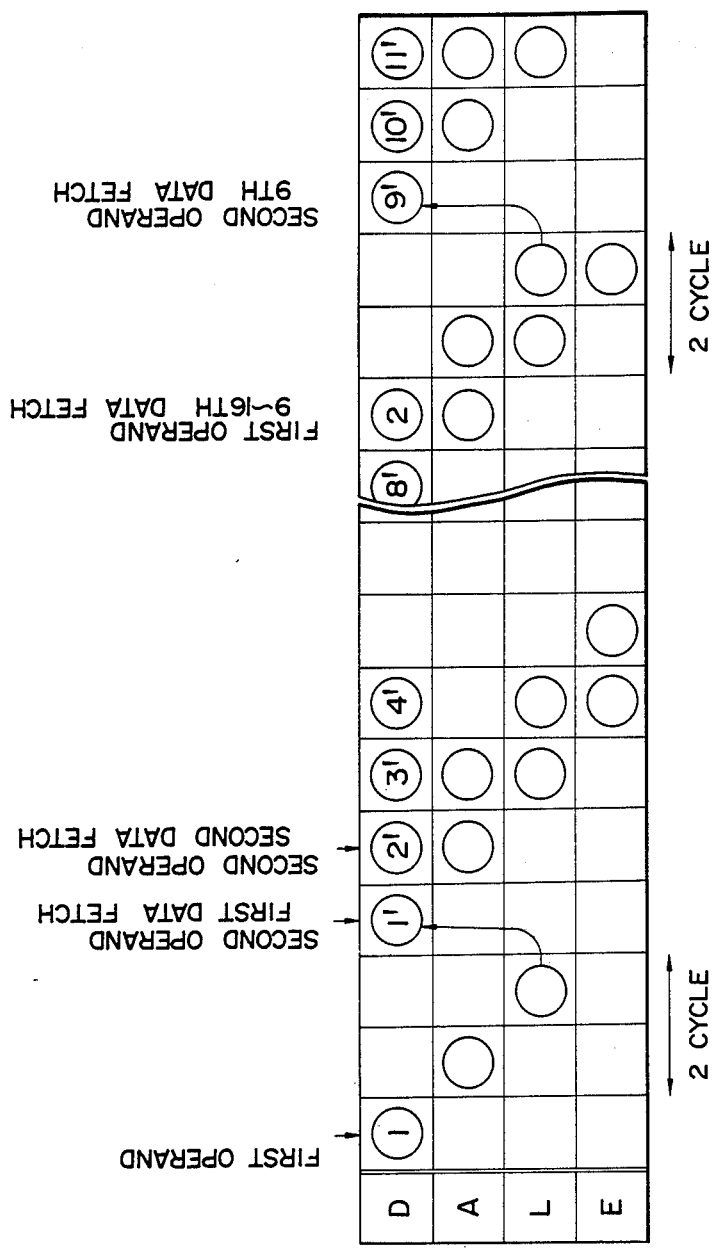
FIG. 3 illustrates a flow of translation instruction processing in the conventional instruction processor.
Figure 4:
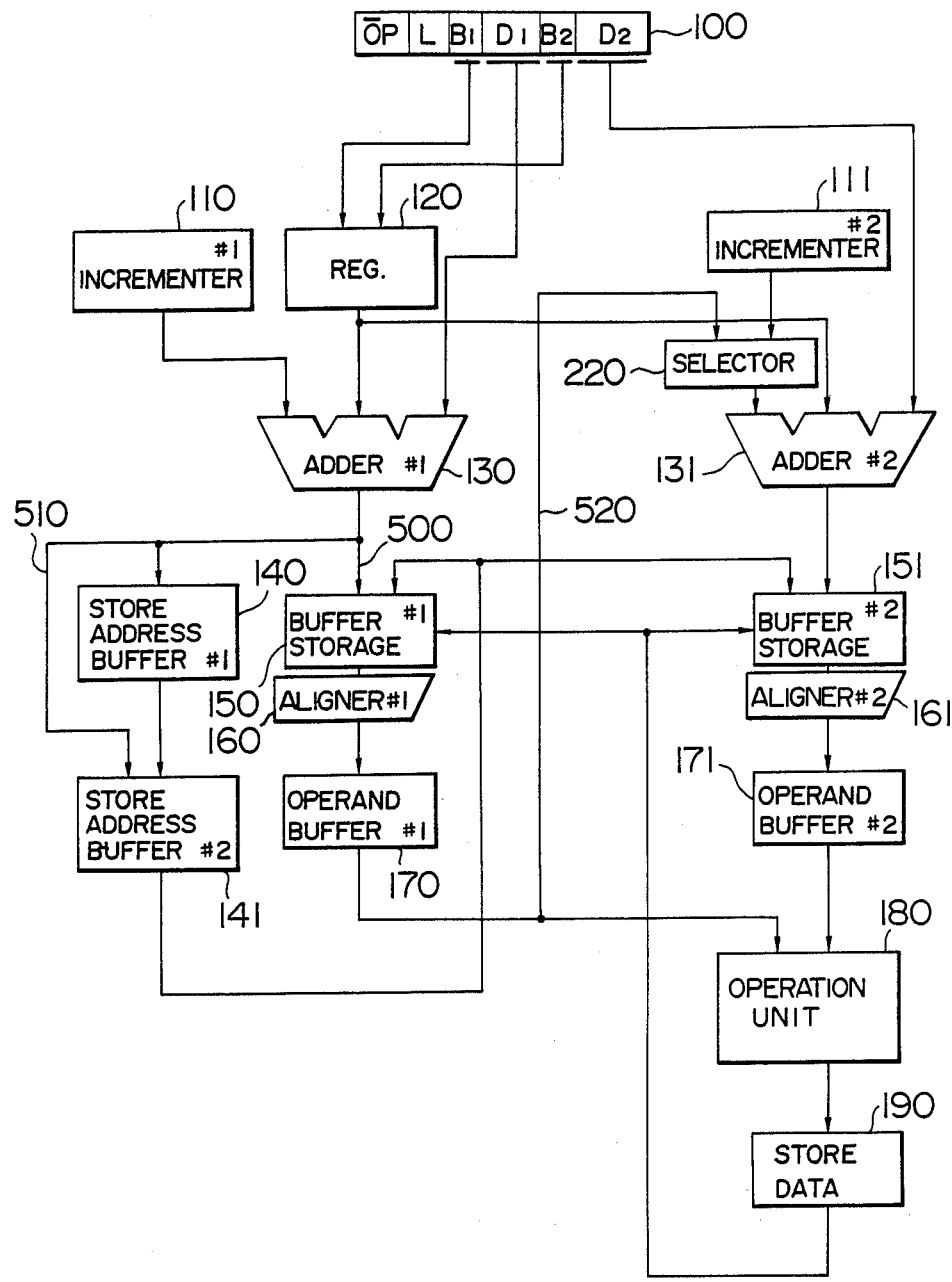
FIG. 4 is a schematic block diagram of an instruction processor in accordance with the present invention.
Figure 2:
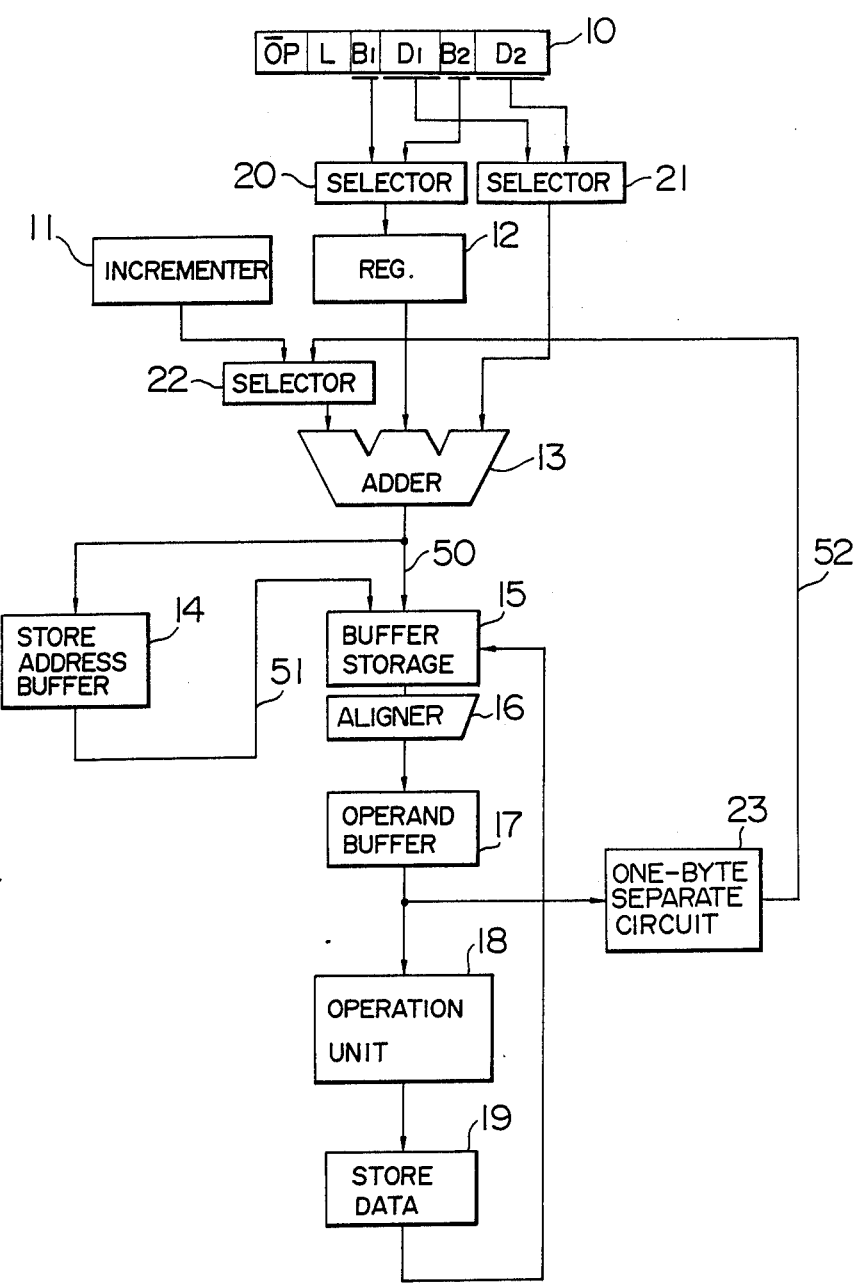
FIG. 2 is a schematic block diagram depicting the conventional instruction processor.

FIG. 4 illustrates a schematic block diagram showing the construction of an instruction processor in accordance with the present invention. In an instruction processing of an instruction requiring two operands, there are provided an address calculation adder and a buffer storage independently for each memory operand, hence the fetch operations of the first and second operands can be executed independently in the respective circuits.

The instruction processor of FIG. 4 is different from that of FIG. 1 in that it is provided with two incrementers, two adders, two buffer storages, and two operand buffers. One unit of each pair of these devices is utilized to execute address calculation and data fetch operations with respect to the first operand, whereas the other unit thereof is adapted to perform the same with respect to the second operand. The former and latter circuit groups are respectively referred to as the first and second fetch circuits.

The instruction processor has two types of operation functions: One is applicable to a case in which the first and second operand fetch circuits conduct synchronous operations with respect to each other and the other is applicable to a case in which these circuits perform completely asynchronous and independent operations. Although the gist of the present invention resides in the latter case (asynchronous operations), the synchronous operations will be briefly described for the easy understanding of the instruction processing, then the asynchronous operation will be explained.

Assume that an instruction requiring two memory operands is set into an instruction register 100 of the instruction processor shown in FIG. 4. Consider an instruction (AND Character) as an example which calculates a logical product of two memory operands and stores the resultant value at the first operand address. The instruction format of the instruction is assumed to be the same as for the translation instruction described hereabove and is depicted in the instruction register 100 of FIG. 4. In order to calculate the operand address of the first operand of this instruction, the value of a general-purpose register 120 specified by the base address B1 of the instruction, the value of the displacement D1 of the instruction, and the value of an incrementer 110 (0 for the first operation and i−1 for the i−th operation) are inputted to an adder 130. On the other hand, the value of the general-purpose register 120 specified by the base address B2 of the instruction, the value of the displacement D2 of the instruction, and the value of an incrementer 111 (0 for the first operation and i−1 for the i−th operation) are inputted to an adder 131 to calculate the operand address of the second operand. For this instruction, the first and second operand address calculations of the adders 130 and 131, respectively are executed in a synchronous manner and the addition results are transferred to buffer storages 150 and 151, respectively, in order to fetch both operands. That is, the first and second operands are fetched from the buffer storages 150 and 151, respectively. The fetched data is passed through aligners 160 and 161, respectively, to be stored in operand buffers 170 and 171, respectively, and then these values are inputted to an operation unit 180. In the operation unit 180, the logical product of the data respectively stored in the operand buffers 170 and 171 is calculated. Thus, the operand addresses of the first and second operands are generated sequentially in response to instructions which are applied to the instruction register 100 sequentially.

On the other hand, an output from the adder 130, that is, the address addition result for the first operand is transferred via a signal line 510 to a store address buffer 141 so as to be utilized as the store address for storing the operation result. The operation result from the operation unit 180 is stored in the buffer storages 150 and 151 via a store data register 190 using the store address which is read from the store address buffer. Since the overlap processing in the pipeline control system is applicable to all of the address calculation, operand fetch operation, data store operations to operand buffers, and arithmetic operations, the i−th fetch operation of the first operand is executed in synchronism with that of the second operand, which is overlapped with processing of data fetched by an operation prior to the (i−1)th fetch operation, thereby realizing continuous operand fetch operations.

In the synchronous operation described above, the first and second operand fetch circuits perform an idential operation, hence an instruction requiring two memory operands can be processed in the same way as for an instruction having only one memory operand.

Next, the asynchronous operations will be described. Assume that a translation instruction is set into the instruction register 100 of FIG. 4. Like the synchronous operation, the adder 130, the buffer storage 150, the aligner 160, and the operand buffer 170 are utilized to execute the first operand address calculation and argument byte fetch operation, whereas the adder 131, the buffer storage 151, the aligner 161, and the operand buffer 171 are used to perform the second operand address calculation and function byte fetch operation. The asynchronous operation is processed as follows. First, the first address (the initial increment value is 0) of the first operand is calculated by the adder 130 and the first byte (argument byte) of the first operand is fetched from the buffer storage 150. The fetched argument byte is aligned so as to be utilized to execute the subsequent address calculation of the second operand and the obtained data is stored in the operand buffer 170. The output from the adder 130 is also stored in the store address buffer 140 and is used when the function byte of the second operand is stored. Since the overlap processing in accordance with the pipeline control system is applicable to the operations described above regardless of whether or not the second operand address calculation or function byte fetch operation has been initiated, the first operand can be fetched by sequentially executing the address calculation for the second and subsequent argument bytes of the first operand by use of the adder 130. In this case, each byte of the data stored in the buffer storage 150 is sequentially fetched by incrementing the value of the incrementer 110 by one, that is, 1, 2, . . . , and so on. The address calculation results and the fetched argument bytes are successively stored in the store address buffer 140 and the operand buffer 170, respectively. On the other hand, when the fetch data (argument byte) of the first operand is stored in the operand buffer 170, a one-byte data is fetched from the operand buffer 170. The operand buffer 170 carries out the data store and fetch operations in synchronism with the first and second operand fetch circuits, respectively so as to cause both circuits to operate in an asynchronous manner. The one-byte data fetched from the operand buffer 170 and selected by a selector 220 the contents of the general purpose register 120 specified by the base register B2 of the instruction, and the value of the displacement D2 thereof are inputted to the adder 131 to be added therein to obtain the address of the second operand. The one-byte data (function byte) of the second operand is fetched by use of the obtained address and is stored in the operand buffer 171. Thus, the one-byte data of the second operand is fetched in response to the fetch of the one-byte data from the operand buffer 170, sequentially. At the same time, the associated store address is moved from a store address buffer 140 to the store address buffer 141. Thereafter, the function byte is transferred through the operation unit 180 and the store data register 190 to be stored in the buffer registers 150 and 151. In this operation, the store address (fetch address of the argument byte of the corresponding first operand) fetched from the store address buffer 141 is used. The accumulator does not take any action with respect to the data in this case, that is, it functions only as a data path. If the fetch operation of the argument byte of the first operand is completed and the argument byte is stored in the operand buffer 170, the second operand address calculation and function byte fetch and store operations can be executed completely asynchronously with respect to the first operand address calculation and argument byte fetch operation. As a result, the flow of the translation instruction processing is represented as shown in FIG. 6 in which the address calculation and argument byte fetch operation for the i—th data of the first operand are linked with those of the i—th function byte of the second operand.

When carrying out a process of an instruction in which process the second operand is read out by using the fetched data of the first operand as stated above also, it is possible to carry out fetching of the first operand entirely independently from fetching of the second operand, by providing an address adder and buffer storage for the first operand and an address adder and buffer storage for the second operand, and also by not fetching n bytes of the first operand at one time, but by fetching one byte at a time.

That is, the argument byte address calculation and fetch operation for the first operand can be sequentially performed before the function byte address calculation and fetch operation for the second operand are started, hence the two-cycle overhead occurring once every n fetch operations in the conventional instruction processor does not take place at all. Since only one byte of the argument byte of the first operand is fetched at a time and is aligned so as to be inputted to an address adder, the one-byte separate circuit utilized in the prior art instruction processor can be dispensed with.

In accordance with the present invention, the argument byte calculation and fetch operation for the first operand can be executed completely independently of and asynchronously with respect to the processing of the second operand in the translation instruction processing, the two-cycle overhead taking place once every n fetch operations in the conventional data processing system can be removed, thereby enhancing the high-speed processing.

Conventionally, n bytes of the argument byte data of the first operand are fetched at a time, so a circuit for separating and obtaining one byte from the n-byte data is required to calculate the address of the function byte of the second operand; however, the one-byte fetch operation is adopted to fetch the argument byte in accordance with the present invention, the one-byte fetch circuit becomes unnecessary, thereby simplifying the circuit configuration.

Further, by fetching the first operand a byte at a time, the circuit for counting up the store address one by one or the circuit for arranging n bytes of store data and storing the arranged data at one time becomes unnecessary.

We claim:
1. A pipelined instruction processor, comprising:
first and second buffer storage means each for holding operand data items;
first address generating means connected to said first buffer storage means and responsive to an applied instruction of a first or second kind for sequentially applying addresses of first operand data items requested by the applied instruction of the first or second kind to said first buffer storage means so as to sequentially read the first operand data items from said first buffer storage means;
second address generating means operating concurrently with said first address generating means and connected to said first and second buffer storage means and (i) responsive to the instruction of the first kind being applied to said first address generating means for sequentially applying addresses of second operand data items requested by the instruction of the first kind to said second buffer storage means, each address of a second operand data item being applied to said second buffer storage means in synchronism with the generation of an address of a corresponding first operand data item by said first address generating means, so that each of the second operand data items are sequentially read out from said second buffer storage means in synchronism with read out of a corresponding first operand data item from said first buffer storage means, and (ii) responsive to the instruction of the second king being applied to the first address generating means and to each first operand data item read out from said first buffer storage means for sequentially applying addresses of second operand data items requested by the instruction of the second kind to said second buffer storage means, each address of a second operand data item depending upon a corresponding first operand data item read out of said first buffer storage means, so that each of the second operand data items are sequentially read out from said second buffer storage means in response to read out of a corresponding first operand data item from said first buffer storage means;
operation means connected to said first and second buffer storage means and (i) responsive to the instruction of the first kind being applied to said first address generating means for sequentially performing an operation requested by the instruction of the first kind on each pair of a first operand data item read out from said first buffer storage means and a corresponding second operand data item read out synchronously from said second buffer storage means so that third operand data items corresponding to the result of the operations are sequentially provided to said first buffer storage means and (ii) responsive to the instruction of the second kind being applied to said first address generating means for sequentially transferring the second operand data items read out from said second buffer storage means to said first buffer storage means; and transfer means connected to said first address generating means and said first buffer storage means and (i) responsive to the instruction of the first kind being applied to said first address generating means for sequentially transferring the generated address of the first operand data items requested by the instruction of the first kind to said first buffer storage means as write addresses thereto, each in synchronism with transfer of each of the third operand data items to said first buffer storage means, and (ii) responsive to the instruction of the second kind being applied to said first address generating means for sequentially transferring the generated addresses of the first operand data items requested by the instruction of the second kind to said first buffer storage means as write addresses thereto, each in synchronism with transfer of one of the second operand data items to said first buffer storage means.

2. A pipelined instruction processor according to claim 1, wherein said first address generating means includes:

a plurality of registers each being designated by an instruction;

first increment means for sequentially generating address data items; and first adder means connected to said plurality of registers and said first increment means for generating the addresses of the first operand data items requested by an applied instruction of the first kind or the second kind by adding each of the address data items generated by said first increment means to a data item read out from one of the registers designated by the instruction; and wherein said second address generating means includes:

second increment means for sequentially generating address data items;

select means connected to said first buffer storage means and said second increment means for selectively providing the address data items generated by said second increment means or the read out first operand data items from said first buffer storage means depending on whether the instruction applied to said first address generating means is of the first or second kind; respectively; and second adder means connected to said plurality of registers and said select means for generating the addresses of the second operand data items requested by an applied instruction by adding the address data items produced by said select means to a data item read out from one of said registers designated by the instruction.

3. A pipelined instruction processor, comprising:

first and second buffer storage means each for holding operand data items;

first address means connected to said first buffer storage means and responsive to an applied instruction for sequentially generating addresses for first operand data items requested by the instruction so as to sequentially read the first operand data items from said first buffer storage means;

second address means operating concurrently with said first address means and connected to said first and second buffer storage means and responsive to said applied instruction and to each of the first operand data items read out of said first buffer storage means for sequentially generating addresses for second operand data items requested by the instruction, each depending upon a corresponding read out first operand data item so as to sequentially read the second operand data items from said second buffer storage means;

first transfer means connected to said first and second buffer storage means for sequentially transferring the read out second operand data items to said first buffer storage means; and second transfer means operating concurrently with said first address means and connected to said first address means and said first buffer storage means for transferring the addresses generated by said first address means to said first storage means as write addresses, each in synchronism with transfer of one of the second operand data items to said first storage means.

4. A pipelined instruction processor, according to claim 3, wherein said first address means includes:

a plurality of registers each being designated by an applied instruction;

increment means for sequentially generating different address data items; and first adder means connected to said plurality of registers and said increment means for generating the addresses of the first operand data items by adding each of the address data items generated by said increment means to an address data item held by a first one of the registers designated by the instruction; and wherein said second address means includes:

second adder means connected to said plurality of registers and said first buffer storage means for adding each of the read out first operand data items to an address data item held by a second one of the registers designated by the instruction.

5. A pipelined instruction processor according to claim 4, wherein said first adder means includes means for adding each of the address data items generated by said increment means and an address data item held by the first register to a first displacement data item included in the applied instruction; and wherein said second adder means includes means for adding each of the read out first operand data items and the address data item held by said second register to a second displacement data item included in the applied instruction.

6. A pipelined instruction processor, comprising:

first and second buffer storage means each for holding operand data items;

first address means connected to said first buffer storage means and responsive to an instruction of a first kind or an instruction of a second kind for sequentially generating and providing addresses of first operand data items requested by an instruction of the first kind or second operand data items requested by an instruction of the second kind to said first buffer storage means so as to sequentially read the first or second operand data items from said first buffer storage means;

second address means operating concurrently with said first address means and connected to said first and second buffer storage means and (i) responsive to the instruction of the first kind for sequentially generating and providing addresses of third operand data items requested by the instruction of the first kind to said second buffer storage means so that the third operand data items are sequentially read out from said second buffer storage means, and (ii) responsive to the instruction of the second kind and to said second operand data items read out of said first buffer storage means for sequentially generating and providing addresses of fourth operand data items requested by the instruction of the second kind to said second buffer storage means so as to sequentially read the fourth data items therefrom;

operation means connected to said first and second buffer storage means and (i) responsive to the instruction of the first kind for sequentially performing an operation requested by the instruction of the first kind on each pair of a first operand data item read out from said first buffer storage means and a corresponding third operand data item read out from said second buffer storage means so that fifth operand data items corresponding to the result of the operations are sequentially provided to said first buffer storage means, and (ii) responsive to the instruction of the second kind for sequentially transferring the fourth operand data items read out from said second buffer storage means to said first buffer storage means; and transfer means connected to said first address means and said first buffer storage means and (i) responsive to the instruction of the first kind for sequentially transferring the generated addresses of the first operand data items to said first buffer storage means as write addresses thereto, each for one of the fifth operand data items transferred by said operation means to said first buffer storage means, and (ii) responsive to the instruction of the second kind for sequentially transferring the generated addresses of the second operand data items to said first buffer storage means as write addresses thereto, each for one of the fourth operand data items transferred by said operation means to said first buffer storage means.

7. A pipelined instruction processor according to claim 6, wherein said first address means includes:

a plurality of registers each being designated by an instruction;

first increment means for sequentially generating address data items; and first adder means connected to said plurality of registers and said first increment means for generating addresses of the first operand data items or the second operand data items, respectively, requested by an applied instruction of the first kind or the second kind by adding each of the address data items generated by said first increment means to a first address data item held by a first one of the registers designated by the instruction of the first or second kind; and wherein said second address means includes:

second increment means for sequentially generating address data items;

select means connected to said first buffer storage means and said second increment means for selectively providing the address data items generated by said second increment means or the second operand data items read out of said first buffer storage means, respectively, depending upon whether the applied instruction is an instruction of the first kind or an instruction of the second kind; and second adder means connected to said plurality of registers and said select means for generating addresses of the second operand data items or the addresses of the fourth operand data items by adding each of the address data items or each of the second operand data items provided by said select means to a second address data item held by a second one of the registers designated by the applied instruction.

8. A pipelined instruction processor according to claim 7, wherein said first adder means includes means for adding each of the address data items generated by said first increment means and the first address data item held by the first register to a first displacement data item included in the instruction of the first or second kind; and wherein said second adder means includes means for adding each of the address data items or each of the second operand data items transferred by said select means, and the second address data item held by the second register to a second displacement data item included in the instruction of the first or second kind.

9. A pipelined instruction processor, according to claim 3, wherein said first transfer means includes first operand buffer means connected to said first and second buffer means for temporarily holding the read out second operand data items before supply of the read out second operand data items to said first buffer storage means;

wherein said transfer means includes:

first address buffers connected to said first address means for temporarily holding the addresses of the first operand data items generated by said first address means;

second address means connected to said first address buffer means and said first buffer storage means for receiving the addresses of the first operand data items from said first address buffer means and for temporarily holding the received addresses before supply thereof to said first buffer storage means; and wherein said processor further includes:

second operand buffer means connected to said first buffer storage means and said second address means for temporarily holding said read out first operand data items before supply thereof to said second address means.

10. A pipelined instruction processor according to claim 6, wherein said transfer means includes:

first address buffer means connected to said first address means for temporarily holding the addresses of the second operand data items generated by said first address means; and second address buffer means connected to said first address means, said first address buffer means and said first buffer storage means for temporarily holding the addresses of the first operand data items generated by the first address means before supply of the addresses of the first operand data items to said first buffer storage means and for receiving the addresses of the second operand data items from said first address buffer means and for temporarily holding the received addresses before supply of the addresses of the second operand data items to said first buffer storage means;

wherein said processor further includes:

first operand buffer means connected to said first buffer storage means, said second address means and said operation means for temporarily holding the first operand data items read out from said first buffer storage means before supply of the read out first operand data items to said operation means and for temporarily holding the second operand data items read out from said first buffer storage means before supply of the read out second operand data items to said second address means; and second operand buffer means connected to said second buffer storage means and said operation means for temporarily holding the third operand data items or the firth operand data items read out from said second buffer storage means before supply of the third or fifth operand data items to said operation means.

* * * * *